(12) United States Patent
Duijve et al.

(10) Patent No.: US 7,994,468 B2
(45) Date of Patent: Aug. 9, 2011

(54) METHOD OF MEASURING RELATIVE MOVEMENT IN TWO DIMENSIONS OF AN OBJECT AND AN OPTICAL INPUT DEVICE USING A SINGLE SELF-MIXING LASER

(75) Inventors: Rene Duijve, Eindhoven (NL); Aalbert Stek, Eindhoven (NL); Carsten Heinks, Nordhorn (DE); Marcel Schemmann, Maria Hoop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 569 days.

(21) Appl. No.: 12/064,640

(22) PCT Filed: Aug. 23, 2006

(86) PCT No.: PCT/IB2006/052932
§ 371 (c)(1),
(2), (4) Date: Jul. 9, 2008

(87) PCT Pub. No.: WO2007/026286
PCT Pub. Date: Mar. 8, 2007

(65) Prior Publication Data
US 2009/0212201 A1    Aug. 27, 2009

(30) Foreign Application Priority Data
Aug. 30, 2005 (EP) .................................. 05107935

(51) Int. Cl.
*G09G 5/00* (2006.01)
(52) U.S. Cl. ........................ 250/221; 345/156; 385/12
(58) Field of Classification Search .................. 250/221; 345/157, 156; 715/856
See application file for complete search history.

(56) References Cited

U.S. PATENT DOCUMENTS

| | | | |
|---|---|---|---|
| 6,301,968 B1 | 10/2001 | Maruyama et al. | |
| 6,707,027 B2 | 3/2004 | Liess et al. | |
| 6,741,335 B2 | 5/2004 | Kinrot et al. | |
| 2005/0157971 A1 | 7/2005 | Juijve et al. | |
| 2005/0243053 A1* | 11/2005 | Liess et al. | 345/156 |

FOREIGN PATENT DOCUMENTS

EP            1182606 A2       2/2002

(Continued)

OTHER PUBLICATIONS

Martin Liess, et al: A Miniaturized Multidirectional Optical Motion Sensor and Input Device Based on Laser Self-Mixing, Meas. Sci. Technol. Dec. 2002, pp. 2001-2006, XP001201128.

(Continued)

*Primary Examiner* — Tony Ko (57) ABSTRACT

An optical input device for measuring relative movement between an object (15) and a sensor unit comprising a laser device (3, 5) having a laser cavity for emitting a measuring beam (13, 17) and a respective radiation-sensitive detector (4, 6) for generating a measurement signal representative of changes in the operation of the laser device (3, 5) as a result of measuring beam radiation re-entering the laser cavity. A sensor unit is provided for measuring relative movement along each measuring axis in an action plane, and the resultant measurement signal from one or each of the sensor units is used to determine distance and/or movement of the input device and the object (15) relative to each other along a measuring axis transverse to the action plane by summing the offset frequency of a rising and falling slope of the measurement signal.

11 Claims, 3 Drawing Sheets

FOREIGN PATENT DOCUMENTS

| | | |
|---|---|---|
| GB | 2405710 A | 3/2005 |
| WO | 0109708 A1 | 2/2001 |
| WO | 0237124 A1 | 5/2002 |
| WO | 03098527 A2 | 11/2003 |
| WO | 03102717 A2 | 12/2003 |
| WO | 2005055037 A1 | 6/2005 |
| WO | 2005076116 A2 | 8/2005 |

OTHER PUBLICATIONS

Katsuhiko Hara, et al: New Digital Vibrometer with High Accuracy Using Self-Mixing Type LDV, IEEE Instrunentation and Measurement Tech. Conf. May 19, 1997, pp. 860-864, XP010233690.

* cited by examiner

METHOD OF MEASURING RELATIVE MOVEMENT IN TWO DIMENSIONS OF AN OBJECT AND AN OPTICAL INPUT DEVICE USING A SINGLE SELF-MIXING LASER

The invention relates to a method of determining movement and/or distance of an input device and object relative to each other along a measuring axis in an action plane, the method comprising the steps of illuminating an object surface with a measuring laser beam emitted from the laser cavity of a laser device, measuring changes in operation of the laser cavity, said changes being due to laser self-mixing interference of measuring beam radiation re-entering said laser cavity and an optical wave in said laser cavity and being representative of said movement along said measuring axis, and generating an electric signal representative of said measured changes in operation of said laser cavity.

The invention also relates to an input device provided with an optical module for carrying out the method, and to an input device comprising such an optical module.

Such a method and input device are known from International Patent Application No. WO 03/102717 A2. The input device may be an optical mouse used in a computer configuration to move a cursor across the computer display or monitor, for example, to select a function of a displayed menu. Such an optical mouse is moved across a mouse pad by hand, like a conventional mechanical mouse. The input device may also be an "inverted" optical mouse. The input device is then stationary and, for example, built in to the keyboard of a desktop computer or in a notebook computer or in a handheld apparatus like a mobile phone, a PDA or gaming apparatus, and the object is a user's finger which is moved over a transparent window in the housing of the input device. In the latter applications, optimum use is made of the advantages of the input device, namely that it is small, lightweight, low cost and consumes little power.

As described in WO 03/102717 A2, in order to determine the direction of movement of the object and device along a measuring axis, the drive current supplied to the laser is a periodically varying electric current, for example, a current with triangular shaped periods. Due to this laser modulation, the measured signal shows higher (or "offset") frequency undulation superposed on the rising and falling slopes of the triangles. If the undulation frequency on the rising slopes is equal to that on the falling slopes, the object and device are stationary relative to each other. In the event of relative movement, the undulation frequency on the rising slopes is larger, or smaller, than the undulation frequency on the falling slopes, dependent on the direction of movement along the measuring axis.

When using a computer mouse, it is common practice to lift the mouse from the surface across which it is being moved (in the X- and Y-directions) and then replace the mouse on the surface, for example, to reset the co-ordinate system reference. For this application, the surface forms the so-called action plane, and it is necessary to enable detection of movement in the Z-direction so as to detect when the mouse is lifted from and then replaced on the surface. In fact, there are many applications whereby relative movement of an object and input device in the Z-direction may be required.

In the arrangement described in WO 03/102717 A2, the input device is provided with two diode lasers and two associated photo diodes in perpendicular orientation, which allows measurement of relative movement along two perpendicular (X and Y) directions, or measuring axes, in one plane. Such a device is suitable for an apparatus wherein the movement of a cursor in two directions across a display has to be controlled. If it is also required to measure relative movement along a third (Z) direction or measuring axis, a third diode laser and photo diode needs to be provided. However, such an additional sensor adds cost to the device and makes it more complex.

It is therefore an object of the present invention to provide a method and device of the type defined above which allows the measurement of relative movement and/or distance along two measuring axes between an object and an input device using a single self-mixing laser and radiation sensitive detector, wherein one of the measuring axes is in the action plane and the other measuring axis is transverse thereto.

In accordance with the present invention, there is provided a method of determining movement and/or distance of an input device and object relative to each other along a measuring axis transverse to an action plane, the method comprising the steps of supplying a modulated drive current to a laser device and illuminating an object surface with a measuring laser beam emitted from the laser cavity of said laser device, generating a measurement signal representative of changes in operation of the laser cavity, said changes being due to interference of measuring beam radiation re-entering said laser cavity and an optical wave in said laser cavity and being representative of said movement along said measuring axis, and said measurement signal including a rising portion and a falling portion in each period thereof on which is superposed undulations having an offset frequency, the method further comprising determining distance and/or movement of said object and said input device relative to each other along said measuring axis by summing said offset frequency of a rising portion and a falling portion of said measurement signal, and generating an electric signal representative of said distance and/or movement.

Also in accordance with the present invention, there is provided an optical module for performing a method of determining movement and/or distance of an input device and object relative to each other along a measuring axis transverse to an action plane, the module comprising a laser device having a laser cavity, means for supplying a modulated drive current to said laser device and illuminating an object surface with a measuring laser beam emitted from the laser cavity of said laser device, detector means for generating a measurement signal representative of changes in operation of the laser cavity, said changes being due to interference of measuring beam radiation re-entering said laser cavity and an optical wave in said laser cavity and being representative of said relative movement and/or distance along said measuring axis, and said measurement signal including a rising portion and a falling portion in each period thereof on which is superposed undulations having an offset frequency, the module further comprising electronic processing means for determining distance and/or movement of said object and said input device relative to each other along said measuring axis by summing said offset frequency of a rising portion and a falling portion of said measurement signal, and generating an electric signal representative of said distance and/or movement.

The invention extends to an input device including an optical module as defined above.

Beneficially, said electronic processing means is arranged to determine from the result of summing said offset frequency of a rising and falling portion of said measurement signal if said input device is at a distance from said action plane and, if not, to use a parameter of said measurement signal to measure speed and/or direction of movement in a measuring axis in said action plane of said input device and object relative to each other. Thus, measurement of speed and/or direction of movement along a measuring axis (X or Y) in the action plane is effectively suppressed during determination of distance and/or movement of said object and said input device relative to each other in the measuring axis (Z) transverse to the action plane. In fact, the result of summing the offset frequencies may yield a signal representative of whether or not the input device is at distance from the object, and this signal may be used to enable or suppress measurement of movement along the measurement axis in the action plane.

In one exemplary embodiment, the speed and/or direction of movement of the object and input device relative to each other along a measuring axis in the action plane is determined by determining the difference between the offset frequencies on a respective rising and falling slope of the measurement signal, wherein the value of the result is representative of the speed of movement and the sign of the result is representative of the direction of movement. In a preferred embodiment, a distance between the object and the action plane is measured at known time intervals so as to determine the speed of movement of the object and input device relative to each other along a measurement axis transverse to the action plane and so as to compensate for a contribution thereof to the speed and/or direction of movement determination along the measuring axis in the action plane.

Beneficially, data relating to the absolute distance between said laser device and said object along said measuring axis transverse to the action plane is obtained from the sum of said offset frequencies of a rising and falling portion respectively of said measurement signal. In a preferred embodiment, the electronic processing means is arranged to monitor the sum of said offset frequencies of a respective rising and falling slope of said measurement signal and determine from any change therein a change in the relative distance between said object and said input device (i.e. to identify relative movement of the object and input device relative to each other) along the measuring axis transverse to the action plane. Optionally, any such change may be determined and monitored in relation to a predetermined time interval, so as to determine the speed of any movement of the object and input device relative to each other in the measuring axis transverse to the action plane.

Beneficially, the electronic processing means is further arranged to determine distance and/or movement of said input device relative to said object along the measurement axis transverse to the action plane by determining the phase difference of corresponding events in periods of the measurement signal, wherein said events preferably have a greater periodicity than that of the rising and falling portions of said measurement signal. This, in addition to the summing of offset frequencies of respective rising and falling slopes of the measurement signal, results in a more accurate determination of distance and/or movement of the input device and the object relative to each other along the measurement axis transverse to the action plane.

In a preferred embodiment, the optical module comprises two laser devices for generating two respective measuring beams for illuminating said object, detector means for generating two respective measurement signals representative of changes in operation of the laser cavity, said changes being due to interference of measuring beam radiation re-entering said laser cavity and an optical wave in said laser cavity and being representative of movement of said input device relative to said object along two respective measuring axes in said action plane, each said measurement signal including a rising portion and a falling portion in each period thereof on which is superposed undulations having an offset frequency, the module further comprising electronic processing means for determining distance and/or movement of said object and said input device relative to each other along a measuring axis transverse to said action plane by summing said offset frequency of a rising portion and a falling portion of each measurement signal, and generating an electric signal representative of said distance and/or movement.

Thus, both lasers can be used to determine relative distance and movement between the object and the input device in a measuring axis transverse to the action plane, such that some redundancy is introduced more accurate determination results.

It will be appreciated, therefore, that the above-mentioned object of the invention is achieved in a device according to an exemplary embodiment of the invention comprising at least one self-mixing laser by measuring the relative movement between the object and the device along a measuring axis in the action plane by using the frequency difference of a rising slope and falling slope of the measurement signal, and by using the sum of these offset frequencies to measure the relative distance/movement of the object and input device along a measuring axis transverse to the action plane. This means that one laser is used to measure the relative movement in one direction in the action plane (X-direction or Y-direction), and the relative distance/movement between the object and input device along the Z-direction can be determined using the measurement signal derived from the same laser. Thus, a laser self-mixing device with at least one self-mixing laser can be used as a 2D sensor (X- or Y-direction and Z-direction). A second self-mixing laser can be added to measure relative movement between the object and input device along a second measuring axis in the action plane, the second measuring axis preferably being substantially orthogonal to the first measuring axis in the action plane. In this case, the measurement signal derived from both self-mixing lasers can be used to determine the distance and/or movement of the object and input device relative to each other along the measuring axis transverse to the action plane, with some redundancy effect which yields more accurate measurements. Thus, a device with two self-mixing lasers can be used as a 3D sensor (X-, Y- and Z-directions).

These and other aspects of the present invention will be apparent from, and elucidated with reference to, the embodiments described herein.

Embodiments of the present invention will now be described by way of examples only and with reference to the accompanying drawings, in which:

FIG. 1b is a schematic plan view of the device of FIG. 1a;

Figure 1A:
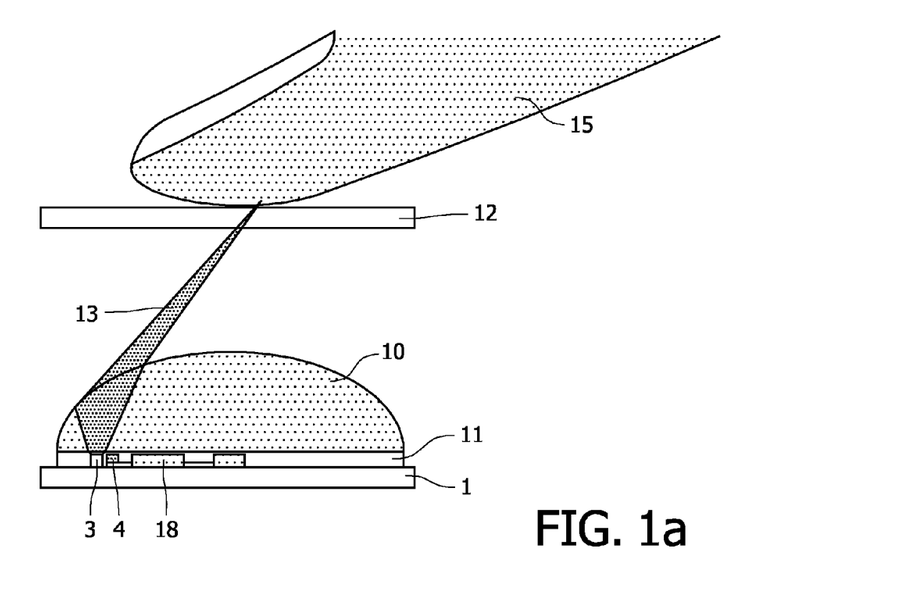
FIG. 1a is a schematic cross-sectional view of an input device according to an exemplary embodiment of the present invention.
Figure 1B:
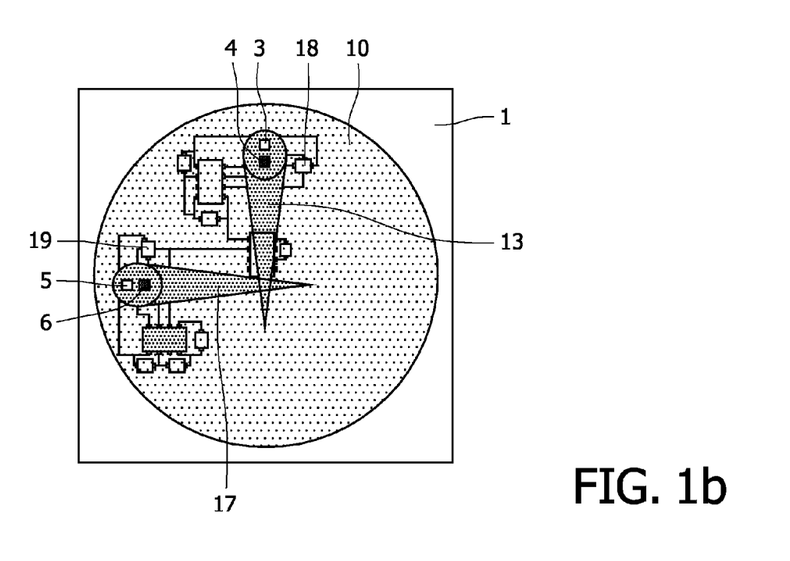

FIG. 1 is a diagrammatic cross-section of an input device according to an exemplary embodiment of the present invention. The device comprises, at its lower side, a base plate 1, which is a carrier for the diode lasers, in the described embodiment VCSEL lasers, and the detectors, for example, photo diodes. In FIG. 1a, only one diode laser 3 and its associated photo diode 4 is visible, but usually at least a second diode laser 5 and associated detector 6 is provided on the base plate, as shown in FIG. 1b which is a diagrammatic plan view of the device. The diode lasers 3, 5 emit measuring beams 13 and 17 respectively. At its upper side, the device is provided with a transparent window 12 across which an object, for example, a human finger is moved. A lens 10, for example, a plano-convex lens, is arranged between the diode lasers and the window. This lens focuses the laser beams 13, 17 at or near the upper side of the transparent window 12. If an object 15 is present at this position, it scatters the beam 13 (and 17). A part of the radiation beam 13 is scattered in the direction of the illumination beam 13 and this part is converged by the lens 10 on the emitting surface of the diode laser 3 and re-enters the laser cavity thereof. As will be explained later, the radiation re-entering the laser cavity induces changes in the intensity of radiation emitted by the diode laser. These changes can be detected by the photo diode 4, which converts the measured changes into an electric signal, and applies the electric signal to an electronic circuit 18 for processing. Similarly, the photo diode 6 converts the measured changes in the intensity of radiation emitted by the diode laser 5 into an electric signal and applies this electric signal to another electronic circuit 19 for processing. As shown in FIG. 1b, the electronic circuits 18, 19 are interconnected. Various degrees of integration of laser and detector are possible, including monolithic integration.

Figure 2:
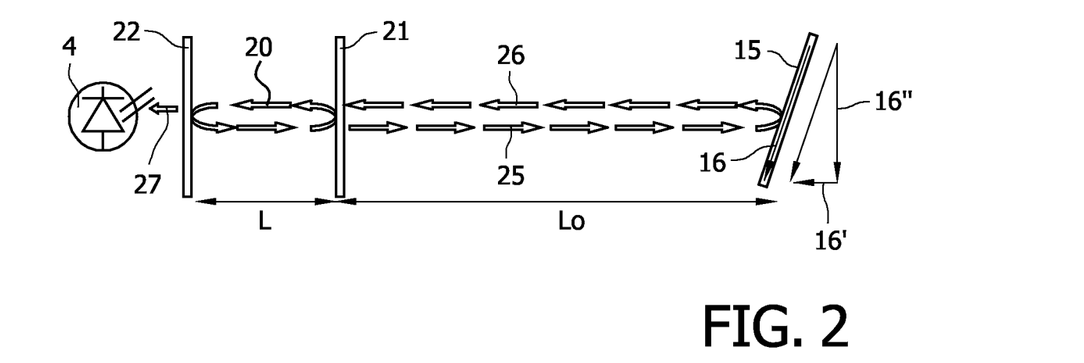
FIG. 2 illustrates the principle of the measuring method of the input device of FIGS. 1a and 1b.

FIG. 2 illustrates the principle of the input device and method of measuring relative movement according to an exemplary embodiment of the present invention, when a horizontal emitting diode laser and monitor photo diode arranged at the rear facet of the laser are used. In FIG. 2, the diode laser, for example, diode laser 3, is schematically represented by its cavity 20 and its front and rear facets, or laser mirrors 21 and 22 respectively. The cavity has a length L. The space between the object 15 and the front facet 21 forms an external cavity, which has a length $L_0$. The laser beam emitted through the front facet is denoted by reference numeral 25 and the radiation reflected by the object in the direction of the front facet is denoted by reference numeral 26. Part of the radiation generated in the laser cavity passes through the rear facet and is captured by the photo diode 4.

If the object 15 moves in the direction of the illumination beam 13, the reflected radiation 26 undergoes a time varying phase delay and Doppler shift. This means that the frequency (and thus phase) of this radiation changes or a frequency shift occurs. This frequency shift is dependent on the speed at which the object moves and is of the order of a few kHz to MHz. The frequency-shifted radiation re-entering the laser cavity interferes with the optical wave, or radiation generated in this cavity, i.e. a self-mixing effect occurs in the cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and is thus easy to detect. The combination of the self-mixing effect and the time-varying phase shift of the reflected light causes a variation in the operation of the laser cavity and, in particular, its gain, or light amplification, and output powers at each mirror vary.

The gain variation $\Delta g$ as a function of the speed v of movement of the object is given by the following equation:

$$\Delta g = -\frac{K}{L} \cdot \cos \cdot \left\{ \frac{4\pi \cdot \upsilon \cdot v \cdot t}{c} + \frac{4\pi \cdot L_0 \cdot t}{c} \right\} \qquad \text{Eq 1}$$

In this equation:
  K is the coupling coefficient to the external cavity; it is indicative of the quantity of radiation coupled out of the laser cavity;
  $\upsilon$ is the frequency of the laser radiation;
  v is the speed of movement of the object in the direction of the illumination beam;
  t is the moment of time; and
  c is the light velocity.

As well as the speed of movement of the object and the amount of movement, i.e. the distance across which the object is moved and which can be measured by integrating the measured speed with respect to time, the direction of movement also needs to be detected, whether the object moves forward or backward along the measuring axis.

Figure 3:
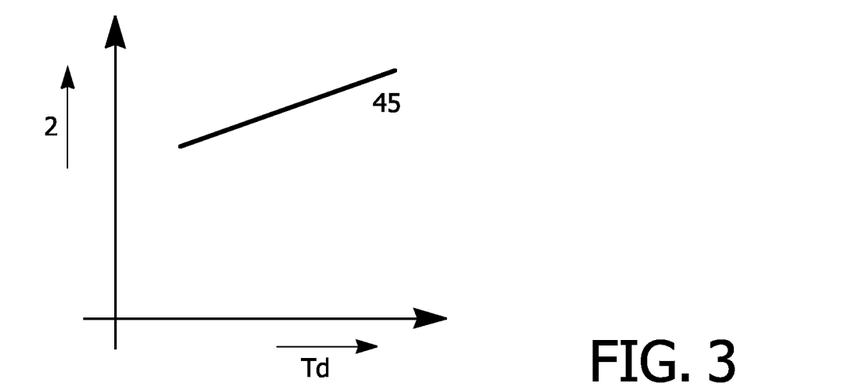
FIG. 3 illustrates the variation of laser wavelength as a function of temperature of the laser with optical feedback.

In one proposed method of determining the direction of movement, use is made of the fact that wavelength $\lambda$ of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 3 shows the temperature ($T_d$) dependency of the wavelength $\lambda$ of the emitted radiation.

Figure 4:
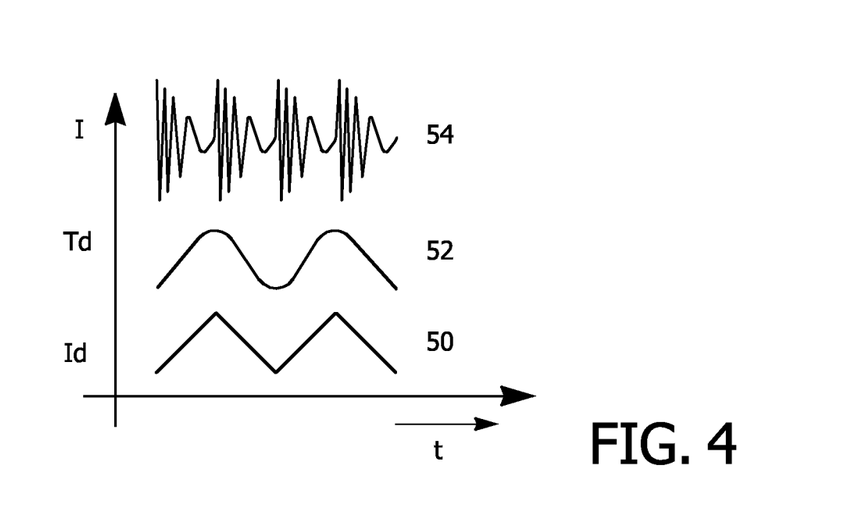
FIG. 4 illustrates the effect of use of a periodically varying drive current for a laser.

If, as is shown in FIG. 4, a periodic drive current $I_d$ (represented by the waveform 50) is supplied to the diode laser, the temperature $T_d$ of the diode laser rises and falls periodically, as shown by waveform 52. This results in a standing optical wave in the laser cavity which has a periodically varying frequency, and thus a continuously varying phase shift with respect to the radiation reflected by the object and re-entering the cavity with a certain time delay. In every half-period of the drive current, there are now successive time segments wherein the diode laser gain is higher and lower, depending on the phase relation of the wave in the cavity and the reflected radiation re-entering the cavity. This results in a time-dependent intensity variation (I) of the emitted radiation as shown by waveform 54 in FIG. 4. This waveform represents the situation for a stationary, or non-moving object. The number of pulses in a first half-period ½p(a) is equal to the number of pulses in a second half-period ½p(b).

A movement of the object causes a varying time shift of the radiation re-entering the laser cavity, i.e. this frequency increases or decreases depending on the direction of movement with the Doppler shift frequency. A movement of the object in one direction, the forward direction, causes a decrease in the wavelength of the re-entering radiation, and a movement in the opposite direction causes an increase in the wavelength of the re-entering radiation. The effect of the periodic frequency modulation of the optical wave in the laser cavity is that, in case the Doppler shift frequency has the same sign as the frequency modulation in the laser cavity, the effect of the Doppler-shifted radiation re-entering the cavity is different from the effect this radiation has in case the frequency modulation and Doppler shift frequency have opposite signs. If the two frequency shifts have the same sign, the phase difference between the wave and the re-entering radiation changes at a slow rate, and the frequency of the resulting modulation of the laser radiation is lower. If the two frequency shifts have opposite signs, the phase difference between the wave and the radiation changes at a faster rate, and the frequency of the resulting modulation of the laser radiation is higher. During a first half-period ½p(a) of the driving laser current, the wavelength of the generated laser radiation increases. In the case of a backward moving object, the wavelength of the re-entering radiation also increases, so that the difference between the frequencies of the wave in the cavity and that of the radiation re-entering this cavity is lower. Thus, the number of time segments during which the wavelength of re-entering radiation is adapted to the wavelength of the generated radiation is smaller than in the case of absence of electrical modulation of the emitted laser radiation. This means that if the object moves in the backward direction, the number of pulses in the first half-period is smaller than in the case where no modulation is applied. In the second half-period ½p(b), wherein the laser temperature and the wavelength of the generated radiation decrease, the number of time segments wherein the wavelength of the re-entering radiation is adapted to that of the generated radiation increases. Thus, for a backward moving object, the number of pulses in the first half-period is smaller than the number of pulses in the second half-period. This is illustrated by the waveform 58 of FIG. 5, which shows the intensity $I_b$ of the laser radiation emitted if the object moves in the backward direction. Comparing this waveform with waveform 54 of FIG. 4 shows that the number of pulses in the first half-period has decreased, and the number of pulses in the second half-period has increased.

Figure 5:
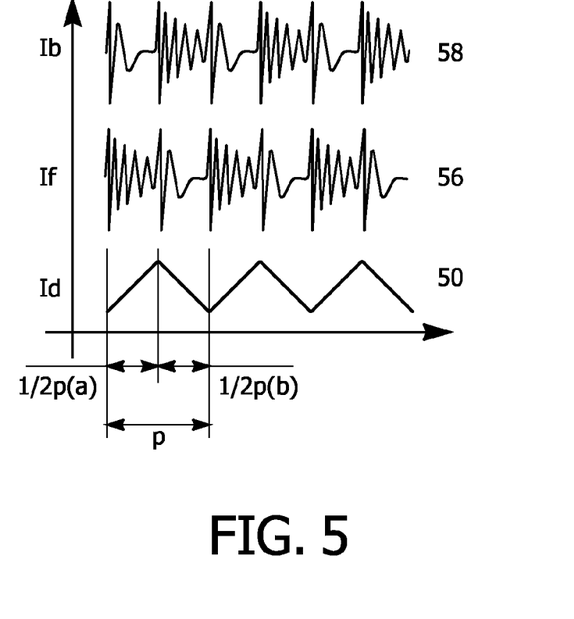
FIG. 5 illustrates how the direction of movement can be detected.

It will be clear from the above that if the object moves in the forward direction, in which the wavelength of radiation scattered by the object and re-entering the laser cavity decreases due to the Doppler effect (object moving towards laser, positive Doppler shift, number of wavelengths fitting between laser and target decreasing, number of wavelengths fitting between laser and target also decreasing due to laser wavelength increase), the number of pulses in the first half-period ½p(a) is larger than the number of pulses in the second half-period ½p(b). This can be verified by comparing waveform 56 of FIG. 5, representing the intensity $I_f$ of the radiation emitted in the case of a forward moving object. In an electronic processing circuit, the number of photo diode signal pulses counted during the second half-period ½p(b) is subtracted from the number of pulses counted during the first half-period ½p(a). If the resulting signal is zero, the object is stationary. If the resulting signal is positive, the object moves in the forward direction and if the signal is negative, the object moves in the backward direction. The resulting number of pulses is proportional to the speed of movement in the forward and backward directions respectively.

Thus, in summary and as described above, in order to determine the direction of relative movement of the object and the device along a measuring axis, the electrical drive current supplied to the laser is a periodically varying electrical current, for example, a current with triangular shaped periods. Due to this laser modulation, the measured signal shows higher frequency, also called "offset frequency", undulations superposed on the rising and falling slopes of the triangles. If the frequency on the rising slopes is equal to the frequency on the falling slopes, the object is stationary with respect to the device. If the object moves, the offset frequency on the rising slopes is larger or smaller than the offset frequency on the falling slopes, depending on the direction of movement along the measuring axis. The offset frequency has a value that is determined by the modulation rate of the laser current and the distance between the device and the object. To measure movement of the object with respect to the device, the offset frequency of the detector output signal is determined, i.e. a frequency analysis is carried out during a given measurement time. For the offset frequency measurement, a Fourier analysis (FFT) or other frequency- or phase-tracking method, for example, using comparing and counting means, can be used.

As stated above, it is an object of the present invention to provide a method which allows the determination of movement and/or relative distance between an object and an input device along a measuring axis that is transverse to the action plane, without the use of an additional sensor. In the method of the present invention, such movement and/or distance along a measuring axis transverse to the action plane is determined by summing the offset frequency on both a rising slope and a falling slope respectively of the electrical measurement signal. Thus, the movement measurement along a first measuring axis in the action plane can be performed by subtracting the offset frequency on the rising slope of the measurement signal from the offset frequency on the falling slope in the same period, whereas the movement/distance measurement along a second measuring axis, transverse to the action plane, can be performed by summing these offset frequencies.

The present invention is based on the insight that the object distance change in the Z-direction causes the frequency of the undulations on both the rising slope and the falling slope to shift in the same way and by the same amount, whereas a movement in the action plane (in the X or Y direction) causes the offset frequency on a rising slope to shift in a manner opposite to the offset frequency shift on a respective falling slope. Thus, since movement in the Z-direction causes a common shift of the two frequencies at a constant frequency difference, and this movement and distance change can be determined by means of the sum of these two frequencies, independently of the movement in the action plane.

The sum of the offset frequencies on a rising and falling slope in the same period of the measurement signal yields information about the absolute distance between the self-mixing laser and the object, when the sensor is calibrated. A change in the sum of the offset frequencies of a rising and falling slope in the same period of the measurement signal yields information about a relative distance change between the sensor and the object, when the sensor is calibrated. Finally, a change in the sum of the offset frequencies on a rising and falling slope of the measurement signal within a certain time interval yields information about the speed of relative movement in the Z-direction.

In other words, the object moves in the X-Y plane then a difference frequency is detected. When the object moves in the Z direction then a difference frequency is also detected. In general, any motion perpendicular to the device generates a difference frequency. Also in general, any change in distance to the object generates a change in sum frequency. However, in the case more is known about the system, such as that the object is essentially a plane in the XY direction then that distance is directly proportional to the Z-distance and the height to the surface (Y) can be determined from the sum frequency.

The fact that a movement in the Z direction also causes difference frequency signals leads to an additional problem: this motion detection is often unwanted in a XY motion detection system. However, in an exemplary embodiment, the distance to the XY plane (the Z-distance) is measured at known time intervals. Therefore, it is possible to deduce the speed in the Z-direction. This speed can, where needed, be used to compensate the unwanted detection of speed in the Z direction.

So, overall, it can be stated that the sum frequency is proportional to the speed along the axis of the laser beam and the sum frequency is proportional to the distance along the laser beam. Combining this with knowledge of the object (essentially an X-Y plane) enables the determination of motion in the Z direction as a change of distance and allows elimination of unwanted Z-speed signals in the X-Y detection outputs.

In addition, the following should be considered: the laser is modulated with up and down slopes and the motion increases a frequency on the one slope and decreases it on the other. As a consequence that decrease could go as low as down to zero or even negative. Once that frequency has become negative it folds around the zero axis (negative frequency cannot be detected as such) and roles reverse. Now the sum frequency is proportional to the speed and the 'difference' frequency is proportional to the distance of the object. This is illustrated in FIG. 6.

Figure 6:
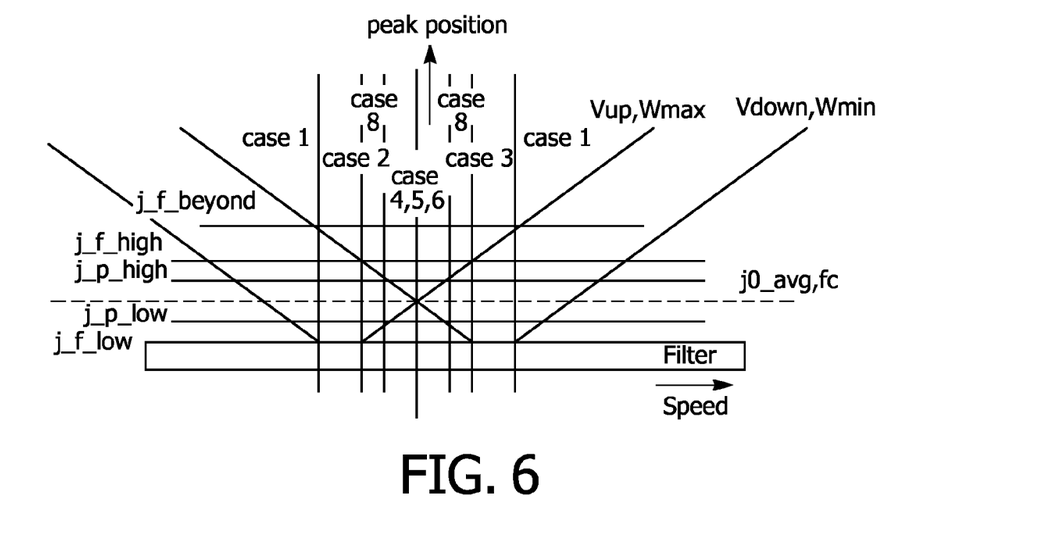
FIG. 6 illustrates the effect on a frequency of a movement which could decrease the frequency below zero.

Many limits are indicated in FIG. 6, not relevant for the present description, but the frequency results from up and down segments are tracked here. In the center region the description given here applies but in the higher speed ranges the folding of the frequencies in the X-axis reverses the role of sum and 'difference' frequencies. The grey area shown in FIG. 6 is for very low frequencies that are difficult to detect. Signal processing can be used to detect signals in this area.

Thus, in a practical embodiment, negative frequencies cannot be detected. Thus when a frequency crosses the X-axis (and becomes negative) any practical measurement now yields a positive result (that is why the curve in FIG. 6 is mirrored in the X-axis). Thus, since it is known that for the higher speed, the sign of the detected frequency is incorrect (for the lower of the two frequencies) the processing means is arranged to change the sign on the 'sum' calculation to obtain signals indicative of speed and distance. The practical outcome is that, in mathematical terms, the sum of the offset frequencies is used to determine the distance and/or movement of the object and input device relative to each other along a measuring axis transverse to the action plane, but in practice, this might be calculated as a 'difference' frequency because of the true sign of the offset frequency although in mathematical terms, it is still the summing of the offset frequencies, taking into account their respective signs.

In addition to summing the offset frequencies on a rising and falling slope in the same period of the measurement signal in order to measure relative movement/distance between an object and the input device in a measuring (Z) axis transverse to the action plane, phase information in respect of the rising and falling slopes can also be used to measure relative movement and distance in the Z-direction, whereby use is made of the fact that a distance change in the Z-direction causes a phase shift, and using phase measurement gives a higher resolution and, in combination with the summation of the offset frequencies, gives a more accurate result. Obviously, whether or not to use the phase measurement as well as the summation of offset frequencies will depend on the accuracy of measurement required to be attained and this in turn will be dependent on the application in which the input device is to be used.

It should also be noted that in extreme cases the modulation frequency of the laser does contain up and down segments, but is chosen so high that complete undulations of the measurement signal do not occur and sum and difference frequencies are not detected. However, phase changes on up and down signals still occur and these can be detected with proper signal processing means. This should be apparent to a person skilled in the art. The same applies to a modulation amplitude that is chosen very low such that detectable sum and difference frequencies are reduced to phase differences (in FIG. 6 that would be in the bottom of the grey area).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of determining movement and/or distance of an input device and object relative to each other along a measuring axis transverse to an action plane, the method comprising the steps of supplying a modulated drive current to a laser device and illuminating an object surface with a measuring laser beam emitted from the laser cavity of said laser device, generating a measurement signal representative of changes in operation of the laser cavity, said changes being due to laser self-mixing interference of measuring beam radiation re-entering said laser cavity and an optical wave in said laser cavity and being representative of said movement along said measuring axis, and said measurement signal including a rising portion and a falling portion in each period thereof on which is superposed undulations having an offset frequency, the method further comprising determining distance and/or movement of said object and said input device relative to each other along said measuring axis by summing said offset frequency of a rising portion and a falling portion of said measurement signal, generating an electric signal representative of said distance and/or movement, and determining from the result of summing of said offset frequency of a rising and falling portion of said measurement signal if said input device is at a distance from said action plane and, if not, using a parameter of said measurement signal to measure speed and/or direction of movement in a measuring axis in said action plane of said input device and object relative to each other.

2. A method according to claim 1, wherein the speed and/or direction of movement of the object and input device relative to each other along a measuring axis in the action plane is determined by determining the difference between the offset frequencies on a respective rising and falling slope of the measurement signal, wherein the value of the result is representative of the speed of movement and the sign of the result is representative of the direction of movement.

3. A method according to claim 2, wherein a distance of said object from said action plane is measured at known time intervals so as to determine the speed of movement of said object and input device relative to each other along a measurement axis transverse to said action plane and so as to compensate for a contribution thereof to said speed and/or direction of movement to said determination along said measuring axis in said action plane.

4. A method according to claim 1, wherein data relating to the absolute distance between said laser device and said object along said measuring axis transverse to the action plane is obtained from the sum of said offset frequencies of a rising and falling portion respectively of said measurement signal.

5. A method according to claim 1, comprising monitoring the sum of said offset frequencies of a respective rising and falling slope of said measurement signal and determining from any change therein a change in the relative distance between said object and said input device along the measuring axis transverse to the action plane.

6. A method according to claim 5, wherein any change in said sum of said offset frequencies is determined and monitored in relation to a predetermined time interval, so as to determine the speed of any movement of the object and input device relative to each other in the measuring axis transverse to the action plane.

7. A method according to claim 1, further comprising determining distance and/or movement of said input device relative to said object along the measurement axis transverse to the action plane by determining the phase difference of corresponding events in periods of the measurement signal, wherein said events preferably have a greater periodicity than that of the rising and falling portions of said measurement signal.

8. An input device including an optical module according to claim 7.

9. An optical module for performing a method of determining movement and/or distance of an input device and object relative to each other along a measuring axis transverse to an action plane, the module comprising a laser device having a laser cavity, means for supplying a modulated drive current to said laser device and illuminating an object surface with a measuring laser beam emitted from the laser cavity of said laser device, detector means for generating a measurement signal representative of changes in operation of the laser cavity, said changes being due to laser self-mixing interference of measuring beam radiation re-entering said laser cavity and an optical wave in said laser cavity and being representative of said relative movement and/or distance along said measuring axis, and said measurement signal including a rising portion and a falling portion in each period thereof on which is superposed undulations having an offset frequency, the module further comprising electronic processing means for determining distance and/or movement of said object and said input device relative to each other along said measuring axis by summing said offset frequency of a rising portion and a falling portion of said measurement signal, generating an electric signal representative of said distance and/or movement, and determining from the result of summing of said offset frequency of a rising and falling portion of said measurement signal if said input device is at a distance from said action plane and, if not, using a parameter of said measurement signal to measure speed and/or direction of movement in a measuring axis in said action plane of said input device and object relative to each other.

10. A module according to claim 9, comprising two laser devices for generating two respective measuring beams for illuminating said object, detector means for generating two respective measurement signals representative of changes in operation of the laser cavity, said changes being due to interference of measuring beam radiation re-entering said laser cavity and an optical wave in said laser cavity and being representative of movement of said input device relative to said object along two respective measuring axes in said action plane, each said measurement signal including a rising portion and a falling portion in each period thereof on which is superposed undulations having an offset frequency, the module further comprising electronic processing means for determining distance and/or movement of said object and said input device relative to each other along a measuring axis transverse to said action plane by summing of said offset frequency of a rising portion and a falling portion of each measurement signal, and generating an electric signal representative of said distance and/or movement.

11. An optical module according to claim 9, wherein if the frequency of said modulated drive current exceeds an upper threshold, or is lower than a lower threshold, the distance and/or movement of said object and said input device relative to each other along said measuring axis is determined by means of a phase difference between corresponding events in said measurement signal.

* * * * *